(12) United States Patent
Bill

(10) Patent No.: US 12,296,629 B2
(45) Date of Patent: May 13, 2025

(54) METHOD TO PREDICT GAS TEMPERATURE OF AN AIRCRAFT TIRE FROM A SELECTED TEMPERATURE PROFILE

(71) Applicant: AIRBUS OPERATIONS LIMITED, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 665 days.

(21) Appl. No.: 17/411,907

(22) Filed: Aug. 25, 2021

(65) Prior Publication Data

US 2022/0134818 A1    May 5, 2022

(30) Foreign Application Priority Data

Oct. 30, 2020 (GB) ...................................... 2017258

(51) Int. Cl.
*B60C 23/20* (2006.01)
*B60C 23/04* (2006.01)
*G07C 5/00* (2006.01)

(52) U.S. Cl.
CPC .......... *B60C 23/20* (2013.01); *B60C 23/0479* (2013.01); *G07C 5/006* (2013.01); *G07C 5/008* (2013.01); *B60C 2200/02* (2013.01)

(58) Field of Classification Search
CPC . B60C 23/20; B60C 23/0479; B60C 2200/02; B60C 23/0486; B60C 19/00;
(Continued)

(56) References Cited

U.S. PATENT DOCUMENTS

| 4,673,298 | A |   | 6/1987 | Hunter et al. |
| 6,025,777 | A | * | 2/2000 | Fuller ................. B60C 23/0491 |
|           |   |   |        | 340/447 |

(Continued)

FOREIGN PATENT DOCUMENTS

| EP | 1 393 934 | 3/2004 |
| EP | 1 544 002 | 6/2005 |

(Continued)

OTHER PUBLICATIONS

Combined GB Search and Exam Report cited in GB2017258.1, mailed Mar. 10, 2021, 7 pages.
(Continued)

*Primary Examiner* — Tarun Sinha
(74) *Attorney, Agent, or Firm* — Nixon & Vanderhye P.C.

(57) ABSTRACT

A computer-implemented method of predicting a tire gas temperature of an aircraft tire including receiving data of a plurality of measurements of temperature with associated times after a landing event, the data measured by a tire monitoring device affixed to an aircraft wheel; selecting a temperature profile from a plurality of predetermined temperature profiles based on the received data, the plurality of temperature profiles representing heating and cooling under different conditions; and predicting a future tire gas temperature based on the selected temperature profile and the received data. Another method includes: receiving data of a plurality of measurements of temperature with associated times, the data measured by a tire monitoring device affixed to an aircraft wheel; determining a gradient of the temperature from the data; and predicting a future tire gas temperature using the gradient.

16 Claims, 8 Drawing Sheets

(58) Field of Classification Search
CPC .... B60C 23/0408; G07C 5/006; G07C 5/008; B64C 25/36
See application file for complete search history.

(56) References Cited

U.S. PATENT DOCUMENTS

| | | | |
|---|---|---|---|
| 8,599,044 B2 | 12/2013 | Maggiore et al. | |
| 9,636,955 B2* | 5/2017 | Singh | G01K 13/08 |
| 10,352,774 B2* | 7/2019 | Miller | B60T 8/1703 |
| 2004/0050151 A1* | 3/2004 | Kojima | B60C 23/20 73/146 |
| 2006/0093015 A1* | 5/2006 | Ichihara | B60C 23/20 374/45 |
| 2015/0134197 A1* | 5/2015 | Cahill | B60C 23/0476 701/33.7 |
| 2015/0231936 A1* | 8/2015 | Keller | G08B 7/06 340/442 |
| 2017/0096037 A1* | 4/2017 | Smith | B60C 23/0488 |
| 2019/0118587 A1* | 4/2019 | Shoyama | B60C 23/04 |
| 2022/0185039 A1* | 6/2022 | Puntambekar | B60C 23/0479 |

FOREIGN PATENT DOCUMENTS

| | | |
|---|---|---|
| EP | 2 777 998 | 9/2014 |
| EP | 2 871 079 | 5/2015 |
| EP | 2 910 393 | 8/2015 |
| EP | 3 069 904 | 9/2016 |
| EP | 3 118 030 | 1/2017 |
| EP | 3 498 501 | 6/2019 |
| JP | 2017185888 | 10/2017 |
| JP | 2018025491 | 2/2018 |

OTHER PUBLICATIONS

European Search Report cited in GB 21192520.1 mailed Feb. 1, 2022, 16 pages.

* cited by examiner

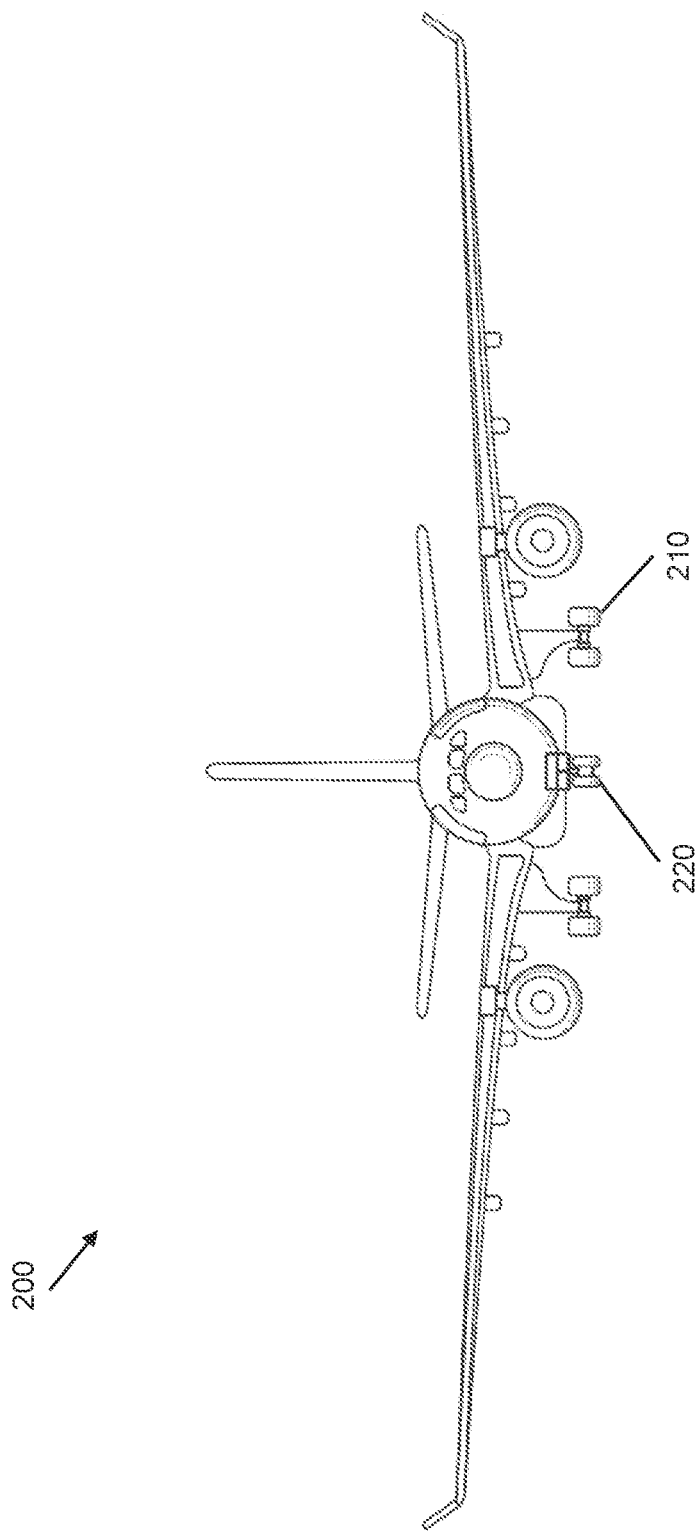

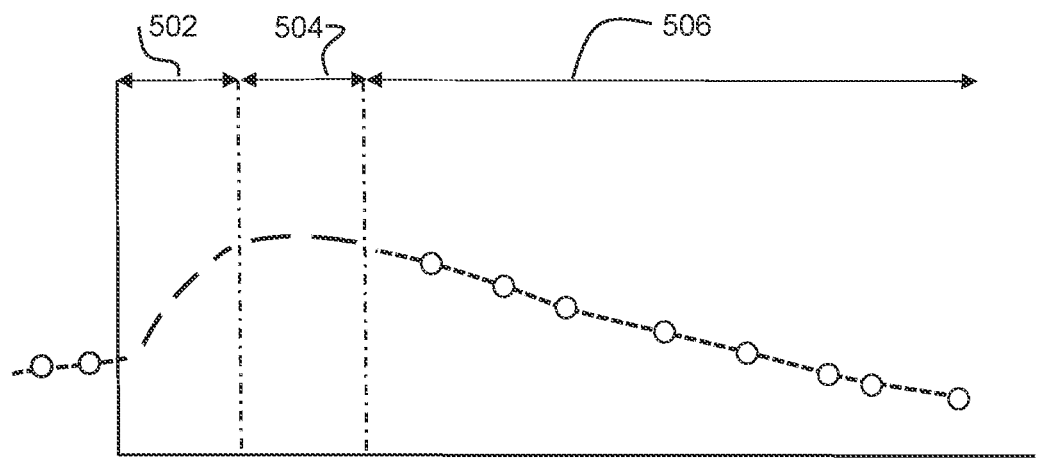
*Fig. 5*
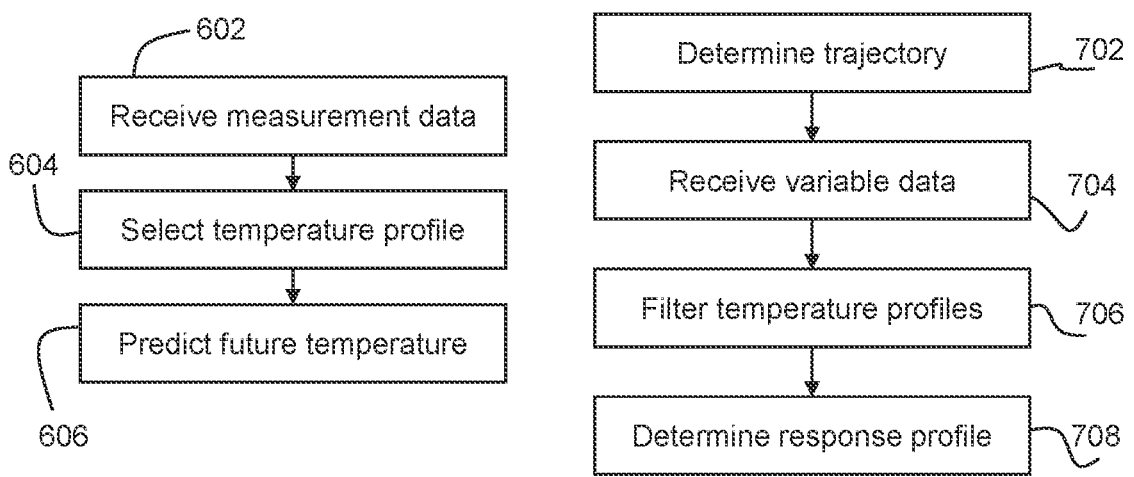
*Fig. 6*
*Fig. 7*

METHOD TO PREDICT GAS TEMPERATURE OF AN AIRCRAFT TIRE FROM A SELECTED TEMPERATURE PROFILE

RELATED APPLICATION

This application claims priority to and incorporates in its entirety United Kingdom Patent Application GB 2017258.1 filed Oct. 30, 2020.

TECHNICAL FIELD

The present invention relates to methods and apparatus for predicting a future temperature of an aircraft tire.

BACKGROUND

Monitoring of tire inflation pressures is an important part of aircraft maintenance. An underinflated tire is more likely to burst during take-off and/or landing and a tire burst can cause significant damage to surrounding aircraft structures. Tire pressure checks are therefore mandated to be carried out at regular intervals for commercial aircraft.

Current methods of tire pressure checking include manual methods (using a pressure gauge to measure each individual tire manually) and automated methods (interrogating pressure sensors attached to each wheel to measure the associated tire pressure). Regardless of whether the pressure check is manual or automated, a decision on tire pressure maintenance is based on readings of all the tires taken in a single measurement session. For example, with manual measurements each tire pressure is measured in sequence and recorded. With automated measurements each tire pressure may be measured substantially simultaneously or may be measured in sequence.

In order to give a reliable result, tire pressure should be measured when the gas in the tire is at ambient temperature. If the tire is above ambient temperature this will increase the measured pressure, so that a tire requiring maintenance may not be correctly identified. If the tire pressure is measured when "hot" or above ambient temperature, the additional gas temperature above ambient will mean that the pressure is higher so that under-inflation is not detected. It can take a long time for the gas in the tire to reach ambient temperature because it is subject to heating from nearby brake system components, such as brake discs, radiating heat while they cool even though the aircraft is standing. Airbus therefore require waiting at least three hours with the aircraft standing before carrying out a tire pressure measurement.

This three-hour requirement can impose significant operational constraints, especially when turnaround is short, so the opportunity to take a tire pressure measurement may be restricted. For example it may only be possible when the aircraft is not in use overnight and has stood for the required amount of time.

Automated pressure sensing devices affixed to an aircraft wheel may include a temperature sensor, but this does not measure the gas temperature directly. The nature of fixation to the wheel means that although pressure is sensed directly, temperature is measured indirectly, by a temperature sensor within the sensing device. The temperature sensor is indirectly coupled to the gas in the tire, it therefore cannot be assumed that the temperature measured is the same as the gas temperature in the tire. Furthermore, the relationship between gas temperature and the temperature sensor is complex, impacted by factors such as time for heat to transfer through the wheel and external sources, such as cooling brake discs and current weather conditions.

It would be desirable to improve aircraft tire maintenance.

SUMMARY

According to a first aspect of the invention, there is provided a computer-implemented method of predicting a tire gas temperature of an aircraft tire. The method comprises: receiving data of a plurality of measurements of temperature with associated times after a landing event, the data measured by a tire monitoring device affixed to an aircraft wheel; selecting a temperature profile from a plurality of predetermined temperature profiles based on the received data, the plurality of temperature profiles representing heating and cooling under different conditions; and predicting a future tire gas temperature based on the selected temperature profile and the received data.

The data of a plurality of measurements preferably comprises data covering a period of at least 30 minutes since the landing event.

The predicting a future tire gas temperature may comprise predicting a time when the tire gas temperature will be equal to or less than a predetermined temperature.

Optionally, the plurality of predetermined temperature profiles comprise profiles for a plurality of aircraft models, and wherein the selecting a temperature profile considers only predetermined temperature profiles for the aircraft model for which tire gas temperature is to be predicted.

Optionally, the plurality of predetermined temperature profiles comprise profiles representing different combinations of variables that influence tire gas temperature, the variables including at least one of wheel position, aircraft model, ambient temperature, weather conditions, and brake cooling fan operation status. The method may then further comprise: receiving input of at least one of the variables that influence tire gas temperature; determining a subset of the plurality of predetermined temperature profiles based on the input; and using the subset in the selecting a temperature profile.

Optionally, the plurality of predetermined temperature profiles are stored in a database and generated from at least one of: a dynamometer test, in-flight data and a simulation. The method may further comprise: generating a temperature profile from the received data of the plurality of measurements; and storing the generated temperature profile to the database.

Optionally, the predicting a future tire gas temperature comprises using gradients to determine a maximum future gas temperature of the tire.

According to a second aspect of the invention, there is provided a computer-implemented method of predicting tire gas temperature of an aircraft tire. The method comprises: receiving data of a plurality of measurements of temperature with associated times, the data measured by a tire monitoring device affixed to an aircraft wheel; determining a gradient of the temperature from the data; and predicting a future tire gas temperature using the gradient.

The predicting a tire gas temperature may comprise predicting that temperature will remain below a predetermined threshold temperature.

The plurality of measurements preferably comprise data covering a period of at least 30 minutes.

A maintenance indication may be provided based on the predicted future gas temperature in either the first aspect or the second aspect.

In either the first aspect of the second aspect, the plurality of measurements of temperature may determined from a plurality of pressure measurements.

According to a third aspect of the invention, there is provided processing system configured to predict tire gas temperature of an aircraft tire according to the method of the first or second aspect.

According to a fourth aspect of the invention, there is provided a computer readable medium comprising instructions that, when executed by a processing system, instruct the processing system to perform the method of the first or second aspect.

Further features and advantages of the invention will become apparent from the following description of preferred embodiments of the invention, given by way of example only, which is made with reference to the accompanying drawings.

BRIEF DESCRIPTION OF THE DRAWINGS

FIG. 2 shows a diagrammatic representation of an aircraft.

FIG. 5 is a plot of an example tire gas temperature against time following a landing event.

FIG. 6 is a flow chart of an example method of predicting tire gas temperature using predetermined temperature profiles;

FIG. 7 is a flow chart of an example method of selecting a temperature profile;

DETAILED DESCRIPTION

Figure 1:
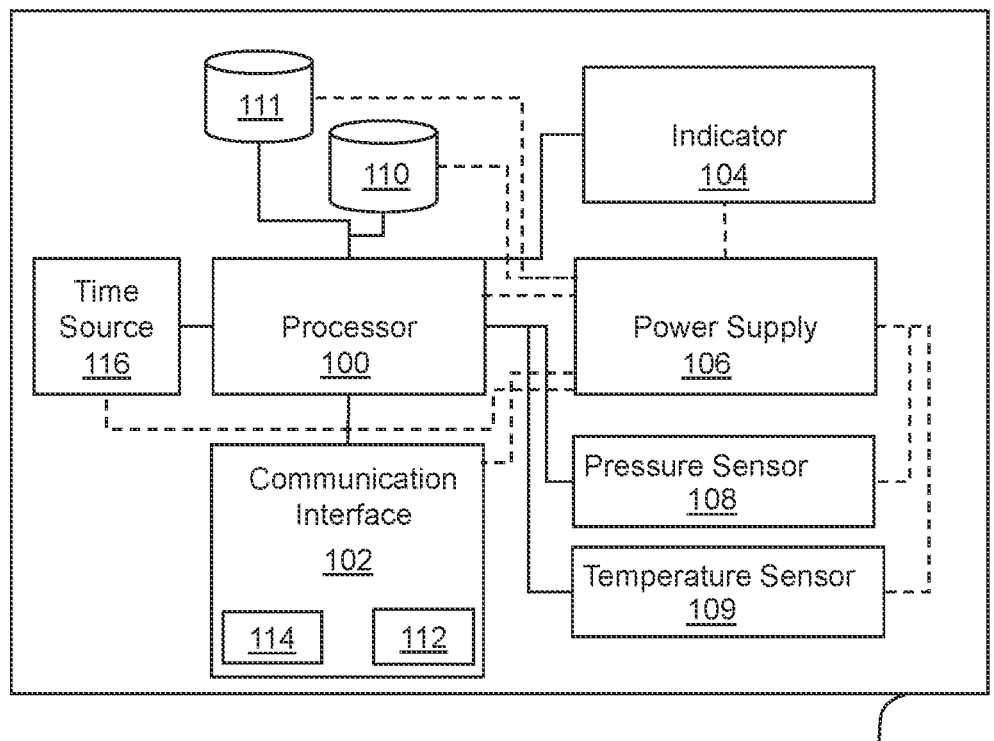
FIG. 1 shows a schematic representation of a tire monitoring device.

It has been found that if a history of tire pressure and temperature measurements is maintained, the historical data can be used to enable improved tire maintenance.

With the advent of automated, electronic tire monitoring devices which are fixed to an aircraft wheel, measurements of tire pressure can be taken at regular intervals to obtain historical data of pressure without requiring operator input and stored with an associated time of measurement or time stamp. When the tire monitoring device also includes a temperature sensor, temperature data can also be stored along with the pressure data. A history of pressure/temperature pairs with an associated time stamp can therefore be built up over time.

Both pressure and temperature vary dependent on the aircraft's operation including the length of flights, turn-around times, ambient temperature at destinations and weather at destinations. As discussed above, the temperature sensor may not directly measure the gas temperature, so it cannot be assumed that the temperature measured by the temperature sensor is an accurate measurement of the actual gas temperature in the tire. This limits the usefulness of historical data because an aircraft experiences wide variation of temperature in use and measured pressure is dependent on temperature.

The present invention is based on the recognition that, even though a temperature sensor of a tire monitoring device is not directly coupled to the gas, it is nevertheless part of overall wheel system and therefore should vary in a predictable way, so that historical data can provide an indication of future behavior. This predictable nature can be used to estimate when a particular temperature will be reached in the future, potentially shortening the time required to wait before on-demand or manual pressure measurements can be taken or tire maintenance is carried out. This can be particularly beneficial for relatively low energy events, such as taxiing from one location to another. Here the overall heat input can be small, but the operational procedures still require the same standing time as following an aircraft landing.

The pressure and temperature data can be stored in memory of the individual sensors themselves or elsewhere, for example in a central system within the aircraft itself or remote from the aircraft, such as a cockpit system or at a maintenance facility. While there may be constraints on the amount of memory which can integrated into the sensors themselves, so that it limits the amount of data that can be retained, transferring the data and storing it elsewhere may enable long histories of measurement data to be stored. For example, a central system may have effectively unlimited data storage for pressure and temperature pairs so that measurement data may be maintained for the entire tire service life. Such a system can also maintain data that persists across physical changes to the tire, such as retreading (also referred to as remolding).

As a further benefit, through the use of an automated sensor to take the measurements, data can be obtained automatically, without additional labor required from maintenance staff.

Measurement data may initially be stored in the tire monitoring device itself, in a central system which is part of aircraft, or both. This measurement data may be transferred to another device or system at times when a tire pressure measurement takes place, for example when a mandated tire pressure check takes place.

The methods and applications discussed herein can be applied to any aircraft using tire monitoring devices that can be instructed to measure pressure and temperature at regular intervals and cause those measurements to be stored with an associated timestamp. An example tire monitoring device is shown in schematic format in FIG. 1.

FIG. 1 shows a schematic representation of a tire sensing device or tire monitoring device 10 for use with the methods and applications described herein. The tire monitoring device 10 is configured for mounting on a wheel, for example by a mechanical connection to an opening on the wheel providing access to the tire. The tire monitoring device 10 includes a processor 100, a communication interface 102, an indicator 104, a power supply 106, a pressure sensor 108, a temperature sensor 109, a first storage 110, a second storage 111 and a time source 116.

Processor 100 may be any suitable processing device including a microprocessor with one or more processing cores. In use, processor 100 coordinates and controls the other components and may be operative to read and/or write computer program instructions and data from/to the storage 110, 111.

Communication interface 102 is connected to the processor 100 and is used to both transmit and receive data from the other devices within a tire pressure sensor system. In this example, the communication interface is a wireless communication interface including two transceivers, 112, 114 which both use different wireless technology. A first transceiver 112 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 112, the second transceiver 114 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 104 is connected to the processor 100 and controlled by the processor 100 to provide indications to a user of the tire pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first color and a second color of emitted light. Further indications can also be provided, such as solid or flashing light. The tire monitoring device has a housing (not shown) and the indicator 104 can provide an indication outside the housing, for example the LED may be mounted external to the housing or visible through the housing, or sound may be able to be emitted from within the housing.

The power supply 106 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the tire monitoring device may spend much of its operational life in "sleep" or low power mode, with most of the components other than the processor and wireless communication interface powered off. This can conserve battery life. For example, the tire monitoring device may be by default in a low power mode, listening for a command to measure or report tire pressure. While in this low power mode the tire monitoring device can be scheduled or otherwise caused to wake up at predetermined intervals or times, sense pressure and temperature and store the results. For example, pressure and temperature may be sensed every minute, every 5 minutes, every 10 minutes, every 15 minutes, every 20 minutes, every 30 minutes, every hour or every 2 hours and stored for use in trend monitoring. It has been found that a measurement every 10 minutes provides a good balance between conserving power and providing useful data for historical trend monitoring.

The pressure sensor 108 is connected to processor 100 and may be any suitable sensor for measuring pressure, for example a capacitive sensor. Similarly, the temperature sensor 109 is connected to processor 100 and may be any suitable sensor for measuring temperature, such as thermocouple. The temperature sensor 109 is arranged to measure the temperature of the gas inside the tire indirectly, by measuring a temperature associated with part of the sensing device which is thermally coupled with the gas through the connection to the wheel.

The connection of the pressure sensor 108 and temperature sensor 109 to the processor 100 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value.

This example includes two storage elements 110 and 111. Storage 110 is non-volatile rewritable storage in this example, such as flash memory which can retain data without requiring applied power. Other examples may include volatile storage, which is kept powered by the power supply, or combinations of read-only and rewritable storage. Storage 110 is connected to the processor 100 and used to store both computer program instructions for execution by the processor and data, such as data from the pressure sensor 108 or data received over the wireless communication interface 102. Storage 110 is therefore configured to store a history of pressure and/or temperature readings sensed by the pressure sensor 108 and the temperature sensor 109. The history may be stored for at least the maximum time between a pressure measurement for tire maintenance, such as for at least three days. This can ensure that enough history is held to provide details since the last maintenance tire pressure reading, so that the history can be transferred for use in trend analysis, along with the current pressure measurement data. In other examples, longer periods of history may also be kept. For example, the previous ten days readings may be stored, with the newest data replacing the oldest once the storage is full, such as using a FIFO structure or similar.

Storage 111 is secure storage to which write and/or read access is restricted, for example only accessible to certain processes running on processor 100. Configuration data, such as wireless encryption keys can be stored in storage 111. In other examples, a single storage may be provided, or storage 110 and 111 may be provided in a single physical device with a logical partitioning between storage 110 and storage 111.

The tire monitoring device 10 also comprises a time source 116, such as a counter or a real time clock. The time source provides a value indicative of current time for indicating the time at which a measurement was taken, for example the processor 100 may cause a current value of the time source to be associated with each pressure and temperature measurement when it is stored in the storage for use as a timestamp.

A timestamp may be an indication of real time (such as Coordinated Universal Time, UTC). A timestamp may also be a relative measurement, such as a counter value where the counter is initialized at a point in the use of the tire monitoring device, such as when the tire monitoring device is first put into service. Where relative timestamps are used, they may be converted to a real time by noting the value of the timestamp for a known time and considering the interval at which the counter is incremented.

It is not required for the time source 116 to be synchronized with other tire monitoring devices on the same aircraft because the methods using historical data described herein can be applied to the data of each monitoring device independently. When data of more than one tire monitoring device is required to be viewed on a common timeline timestamps can be converted to a common reference timeline. For example the current time when a mandated tire pressure measurement takes place may be recorded along with a corresponding value of the timestamp and used to convert.

A tire monitoring device 10 is provided on each wheel of an aircraft. An example aircraft 200 is depicted in FIG. 2, which is a diagrammatic representation of a front view of an Airbus A320 aircraft. The aircraft has six wheels in total; four wheels as part of the main landing gear 210 and two wheels as part of the nose landing gear 220. The aircraft 200 therefore has six tire monitoring devices. Other models of aircraft may have different numbers of wheels and hence different numbers of tire monitoring devices. An Airbus A380 has twenty-two wheels and so will have twenty-two tire monitoring devices, for example.

In one example, the aircraft may include a tire monitoring system which is integrated with a central system of the aircraft, so that the tire monitoring devices themselves are in communication with the central system. For example, the aircraft may be provided with a monitoring system which is accessible through an interface in the cockpit of the aircraft and/or through a separate maintenance system when on the ground. An example of an aircraft with a central system for tire monitoring is the Airbus A380.

In another example, the tire monitoring system may be a standalone system of tire monitoring devices which operate independently from other aircraft systems. Such a system may be provided on an aircraft from new or retrofitted to add functionality to an existing aircraft. An example of such a system is described in EP-3 498 501A1, incorporated herein by reference for all purposes.

Figure 3:
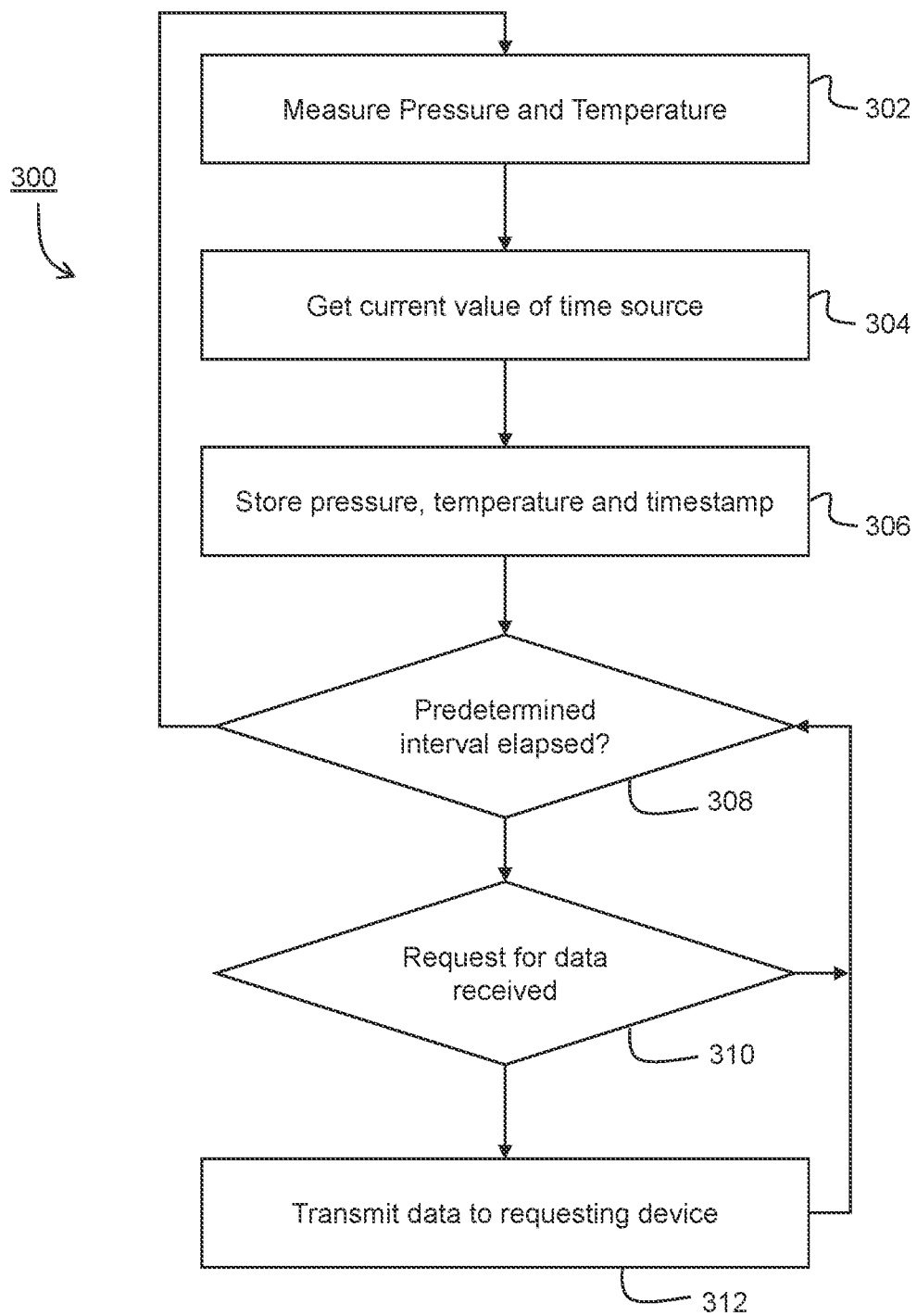
FIG. 3 is a flow chart of an example method for a tire monitoring device to store a history of temperature and pressure measurements.

FIG. 3 depicts a method 300 which can be implemented by a tire monitoring device 10 in order to store a history of temperature and pressure measurements. First, at block 302, the device 10 measures both the pressure and temperature using the pressure sensor and the temperature sensor. The current time is read from the time source at block 304. Next, at block 306, the pressure and temperature measurements are stored in the storage along with an associated timestamp based on the time read from the time source. A single data structure may be used to hold the pressure, temperature and timestamp; the pressure and timestamp may be stored in a separate data structure from the temperature and timestamp; or the pressure, temperature and timestamp may be all be stored separately and associated by common key such as an index number. A single data structure may reduce storage requirements, but separate data structures may allow more flexibility.

Pressure can be stored in any suitable unit, such as psi, atm, or kPa. Likewise, temperature can be stored in any suitable unit, such as QC or K. The timestamp can be a value of the time source or expressed relative to a real time base, such as UTC.

The blocks 302, 304 and 306 are repeated at predetermined intervals. The predetermined interval may be governed by a querying a timer, scheduling at an interrupt at an appropriate time interval and any other suitable method. The predetermined interval can be regular, for example taking a measurement once every 1, 5, 10, 15, 20 or 30 minutes. A measurement every 10 minutes has been found to present a good balance between power saving and gathering enough historical data to allow useful analysis. As depicted in FIG. 3, at block 308 it is determined whether a predetermined time interval has elapsed. If it has the method proceeds to block 302 to take another measurement, if it has not the method proceeds to block 310.

The tire monitoring device can provide a plurality of the stored data to a requesting device in response to a request from another device, such as a maintenance device or a central maintenance system. In the method of FIG. 3, at block 310, while waiting for the next measurement task, the tire monitoring device can monitor for a received request over the communication interface and provide a response, such as by determining if a request for historical data has been received at block 310. If a request has been received, execution proceeds to block 312, otherwise execution returns to block 308.

At block 312, at least a portion of the stored data is provided to the requesting device using the communication interface. For example, the request may specify a required time period for the data or the device may transmit the most recent data for a predetermined period, such for the last day, the last 3 days or the last 10 days. In other examples all the data in the storage is provided to the requesting device.

According to the method of FIG. 3, tire monitoring devices can measure and store data on pressure and temperature over time and provide it to a requesting device. While FIG. 3 has described the use of logical tests at blocks 308 and 310, other examples may use an event-driven structure.

In examples where the tire monitoring device is in communication with a central system of the aircraft, each measurement may be transmitted to the central for storage as they are taken, alternatively or additionally to sending data in response to a request in blocks 310 and 312.

Figure 4:
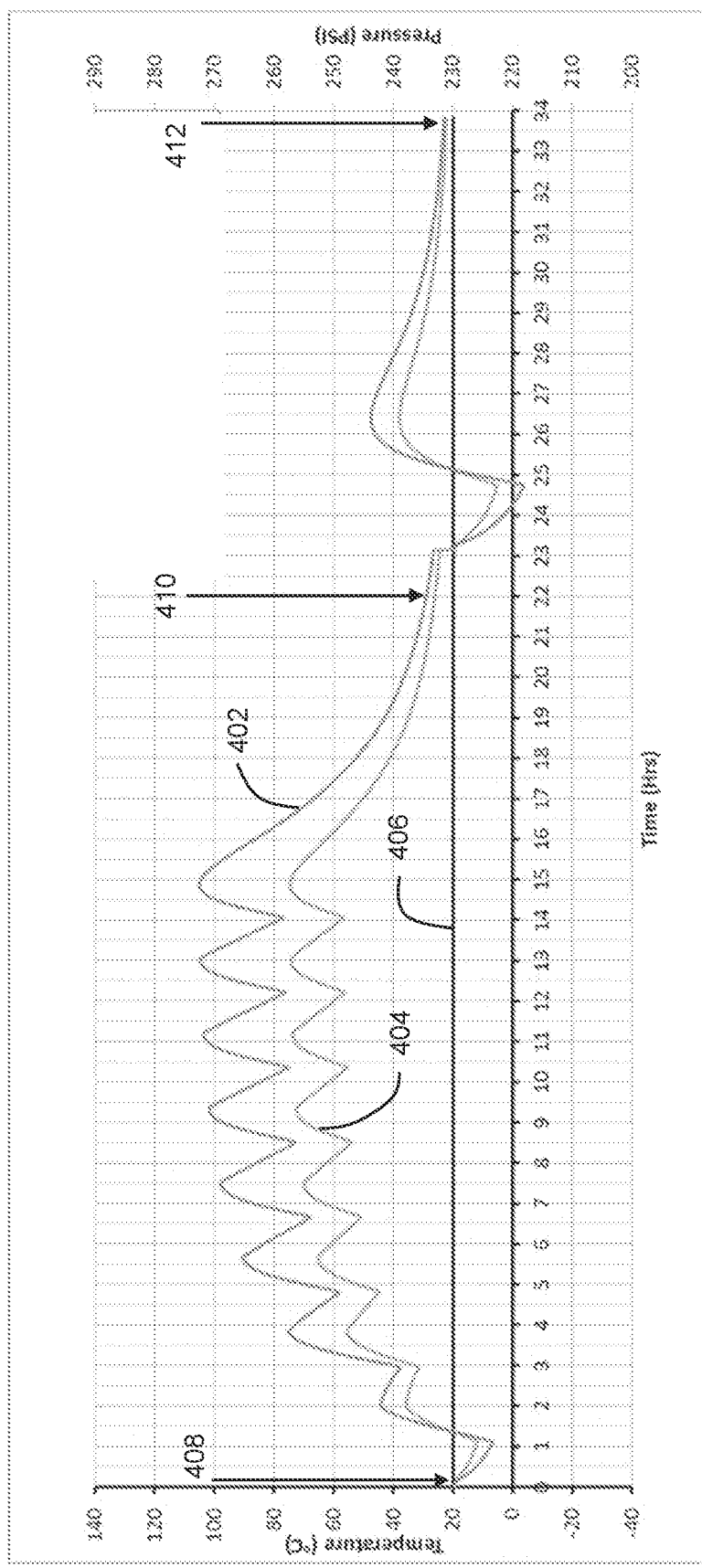
FIG. 4 shows simulated tire pressure and tire gas temperature data against time during operation of an aircraft.

Example data that may be collected by a tire monitoring device as discussed above with reference to FIG. 1 is depicted in the graph of FIG. 4. FIG. 4 depicts simulated pressure and temperature data for an aircraft which carries out eight 1-hour flights on a first day followed by a single 90-minute flight the next day. FIG. 4 depicts the variation in Tire gas pressure 402 (the right-hand axis), Tire gas temperature 404 (left-hand axis) and ambient temperature at ground level 406 (left-hand axis) against time. The simulated data is from a 2-Dimensional Computational Fluid Dynamics (CFD) model of the Wheel, Tire and Brake (WTB). The model is an axisymmetric conjugate heat transfer model which calculates the temperature of all solid and fluid components.

Referring to FIG. 4, the aircraft begins at time=0 hours with pressure and temperature both equal to ambient (20° C./293 K). During the first flight cycle, the low temperature at altitude causes pressure and temperature to drop until the aircraft lands. Landing introduces heat to the tires from several sources, including from the increased temperature at ground level, flexure of the tire on landing and heat radiated from components of the brake system, such as brake discs. The tires continue to heat while the aircraft is standing, for example the brakes radiate heat, warming the gas in the tire, and continue to increase the heat of the gas in the tire for the relatively short time—1 hour—that the aircraft is standing. After take-off the lower temperature at altitude causes cooling, as can be seen for the period from 2 to 3 hours. Landing again causes a heat input and a heating period occurs from time 3 to 4 hours until the aircraft takes off again. The cycle continues until the aircraft ceases operations and stands overnight, from time=14 hours to time=23 hours. During this standing period the pressure and temperature rise to a peak at time 15 hours and then slowly reduce towards ambient. The 90 minute flight between time=23 hours and time=25 hours further cools the tire before temperature rises on landing. Finally, the temperature and pressure again rise to a peak and then reduces towards ambient as the aircraft stands.

The graphs in FIG. 4 show how difficult it is to measure tire pressures reliably for a commercial aircraft because they are constantly changing. In order to ensure that the gas temperature in the tire is close to ambient for an accurate pressure reading, at least a three-hour standing time before taking a pressure measurement is currently mandated, but such a period is not available for much of the day. Even after a three hour standing period, such as can be seen in FIG. 4 from time=14 to 17 hours, tire gas temperature is still around 30 QC above ambient even after three hours standing.

Furthermore, FIG. 4 depicts the actual simulated gas temperature, this is not necessarily the temperature that is measured when the temperature is sensed indirectly as is the case for automated tire monitoring devices. The indirect measurement means that accurate measurement of gas temperature can only be obtained at certain times because the indirect temperature measurement can lead or lag that of the gas in the tire.

It has been observed that when temperature and/or pressure from historical aircraft tire pressure data is plotted against time, the shapes of the curves are predictable. The construction of the tire monitoring device means that pressure is measured directly and is a reliable measurement of the instantaneous tire gas pressure at that point in time. The indirect coupling for the temperature means that temperature is not necessarily a reliable measurement of the gas temperature in the tire at all times, but it still follows predictable patterns.

In some examples pressure measurements may be used to derive tire gas temperature by assuming that the gas obeys the Ideal Gas Law. For an aircraft tire, which is filled with nitrogen to pressures around 200 psi (1,380 kPa/13.8 bar), it can be assumed that the gas in the tire behaves as an ideal gas, and that the tire volume is constant. The pressure may be converted to a corresponding temperature using the Ideal Gas law as follows:

$$T_{end} = \frac{T_{start} P_{end}}{P_{start}}$$

Where $P_{end}$ is the measured pressure to determine a temperature, $P_{start}$ is a recent pressure measurement, $T_{end}$ is the end temperature in K to be determined and $T_{start}$ is the measured temperature in K corresponding to the recent pressure measurement $P_{start}$.

In general, the shape of the tire gas temperature profile following a landing event is depicted in FIG. 5, which shows an example plot of temperature against time based on a typical shape simulated, dynamometer and flight test data. The shape in FIG. 5 is not based on any single source, but is simplified to aid understanding of the characteristics of the temperature profile. The temperature profile can be considered as involving three main phases: a heating phase 502, a transition phase 504 and a cooling phase 506. In the heating phase 502, the temperature of the gas in the tire rises as heat is transferred to the gas from the other components of the wheel system. Those components include the tire itself, which is hot due to flexure on landing, and the brake discs, which are hot from braking. Initially, these components transfer heat into the tire gas. The input of heat from these wheel components in the heating phase 502 is greater than the heat loss to the surroundings so the tire gas temperature increases.

The transition phase 504 follows the heating phase 502 and occurs at the point when the other components of the wheel system have cooled to an extent that the transfer of heat from them to the tire gas is close to equilibrium with the heat loss of the tire gas to the surroundings. This results in a plateau-like section where the temperature rises relatively slowly to a maximum, before initially dropping relatively slowly from that maximum.

Finally, the cooling phase 506 follows the transition phase 504. Here the heat loss from the tire gas to the surroundings is greater than the heat input from the other components of the wheel system. The tire gas therefore gradually cools towards an equilibrium temperature, which is likely to be close to the ambient temperature.

In addition to the wheel system heat inputs, many other variables influence the cooling profile and the rate of temperature changes in each of the temperature phases. These variables may include:
whether brake cooling fans are operational, which will cause the heat input from the brake system components to be reduced more quickly;
ambient temperature, which will influence the rate of heat loss to the surroundings;
weather such as:
wind speed, higher wind speeds improve heat transfer to the surroundings; and
cloud cover/direct sun, direct sun can provide a further heat input to the system.

While the temperature sensor in the tire monitoring device is indirectly coupled to the tire gas temperature, as the temperature nears equilibrium with the surroundings, the temperature of the sensor closely matches the tire gas temperature. In addition, the temperature sensor is influenced by much the same heat inputs as the tire gas. Thus, by examining the temperature profile of the measured temperature from a tire monitoring device, a good estimate of future temperature can be made, for example of the time when the temperature of the system as a whole will close to an equilibrium temperature or close below a threshold temperature. This can then be used to predict when the tire will have cooled to a safe temperature so that tire maintenance can be carried out.

The number of variables in the system are large, which makes it difficult to model the temperature profile with characteristic equations. Instead, it has been found that the temperature profile can be modelled well by maintaining a library or database with many different profiles. The different profiles represent different combinations of the variables that influence the temperature profile. Each profile may be created experimentally, from dynamometer testing, or by using data real-world tests. Each profile may also be created through a simulation, for example by using Computational Fluid Dynamics (CFD). The profile data can also be built up from data measured by the tire monitoring devices in their normal use.

One or more of the variable values may be associated with each cooling profile. For example, each profile may comprise metadata indicating at least one of the variable values that produced it. This can be useful to narrow the number of potential cooling profiles that apply when variables are known. For example, the metadata may indicate whether brake cooling fans are on or not.

The variables above change dependent on landing conditions, in addition different wheel systems and aircraft models introduce additional variables. The construction of the wheel system as a whole has an impact, because it will change the way in which the tire gas is heated after landing by other components of the wheel system and how quickly those other components cool, for example. Similar considerations apply between aircraft models. The profile library can therefore also store metadata to identify this and determine relevant profiles in the library. For example, metadata can identify a particular aircraft model (such as Airbus A320) or a particular wheel/tire combination that the profile relates to.

In addition, tire position on the aircraft also influences cooling profile, so the profile library can also record metadata indicating the tire position that a particular profile relates to. Tire position could be at a general level, such as "nose landing gear" or "main landing gear" positions, or more specific, such as a particular wheel position within the main landing gear.

Once the library of profiles has been created, measured temperature data from the historical data can be analyzed to select a cooling profile from the library that most closely represents the data. For example, pattern matching techniques can be used. In some examples the library of profiles may be pre-filtered to select appropriate cooling profiles based on knowledge of an aircraft type and wheel position. In some cases, such prefiltering may result in a selection of a single temperature profile. The cooling profile can then be used to extrapolate the likely cooling profile in the future and from that predict when a particular temperature will be reached, or the temperature at a particular time.

The accuracy with which a cooling profile can be fitted to the measured data increases the longer period that the measured data is available. At least 30 minutes data is beneficial and at least 45 minutes of data is preferred. Preferably, data of the heating phase and at least part of the transition phase of the cooling profile is available for use with the pattern matching.

The higher the frequency of measurements, the greater the accuracy of the pattern matching, but this involves a trade-off with power requirements for the tire monitoring device. Power draw of the tire monitoring device is correlated with the frequency of measurement because the tire monitoring device can be in a lower power mode between measurements. A measurement interval in the range of 5 to 10 minutes has been found to offer a good balance between being able to predict a cooling profile accurately and increased power draw for the tire monitoring device.

An example method using temperature profiles to predict a tire temperature is shown in FIG. 6. The method can be implemented by a processing system, such as a maintenance device or a central maintenance system, or locally on the tire monitoring device. At block 602, data is received comprising a plurality of measurements of temperature with associated times after a landing event. The data is measured by a tire monitoring device affixed to an aircraft wheel. The data may include only data measured since the last landing event or all data for a predetermined period. A landing event can be recognized in the larger measurement data set by calculating the temperature gradient; because of the large energy input heating is relatively rapid following a landing event, for example a positive temperature gradient of greater than 0.2° C./minute or greater than 0.1° C./minute can indicate the start of a landing event.

Next, at block 604, a temperature profile is selected from a plurality of predetermined temperature profiles based on the received data. This is described below in more detail with reference to FIG. 7. Then, at block 606, a future tire gas temperature is determined based on the selected temperature profile and the received data. For example, the selected temperature profile can be fitted to the measured data and then used to extrapolate future temperature against time. This is shown diagrammatically on FIG. 5, if measured data up to the cooling phase 506 is available (shown with a solid line), this is used to select a closest temperature profile from the library. The cooling phase 506 can then be plotted following on from the measured data using the selected profile (shown with a dashed line) so that temperature in the future is predicted.

The prediction of the temperature can be used to predict when the gas temperature will fall to a level where tire maintenance is safe and/or reliable pressure measurements can be taken. For example, if the safe temperature for tire maintenance is a gas temperature of 50° C., then the time at which the temperature reaches 50° C. can be predicted and reported. For example, the prediction might report that "tire maintenance can be carried out in 30 minutes" or "tire maintenance can be carried out at 16:000". Where the maximum temperature has not yet been reached, the prediction can also include the maximum gas temperature which is reached in the transition phase and possibly also the time to reach that temperature, both of which can be calculated from the temperature profile. In some examples the maximum temperature prediction can be used to provide a maintenance indication or a safety indication, such as an advance warning of high pressure or temperature, or a potentially high differential pressure or temperature, such as might occur if one wheel has a dragging brake, to enable maintenance to be carried out.

In general, the accuracy of the prediction will increase the more measurement data is available. The method of FIG. 6 may be repeated over time to increase the accuracy. For example, the prediction might report "tire maintenance can be carried out in about 2 hours, check predicted temperatures again in 30 minutes for an updated estimate" to prompt a user to make such multiple predictions.

Where insufficient data is available for pattern matching, the method may be halted at block 602 and an error message indicated. For example the error message might be "not enough measurement data recorded yet, try again in 30 minutes". Insufficient data could be identified by looking at the time period since the landing event and ensuring that a minimum predefined time period of measurements, such as 30 minutes, is available. Alternatively, or additionally, insufficient data could be identified at block 604, when no good candidate matching temperature profiles are identified, or too many candidate temperature profiles are identified.

FIG. 7 is a flow chart giving more detail of how a temperature profile can be selected in block 604 of FIG. 6. At block 702 a "trajectory" of the temperature over time is determined by interpolating between the measurement points or by fitting a curve to the measurement points. At block 704, input variables are received, such as the aircraft model, wheel position and factors such as whether brake cooling fans are turned on. The variables may be entered by a maintainer, retrieved from storage, such as a storage in the tire monitoring device indicating a wheel position, or received from another system, such as a weather data service or a central maintenance system. At block 706, the received variable data is used to filter the temperature profiles to only those with metadata compatible with the variable data. For example, if the variable data indicates that brake cooling fans are on, then only temperature profiles with metadata indicating that the brake cooling fans were on are considered for selection. Then, at block 708, a response profile is determined from the filtered temperature profiles is determined or selected that best fits the measured data. For example, pattern matching techniques can be used to determine which profile has the best fit.

Figure 8:
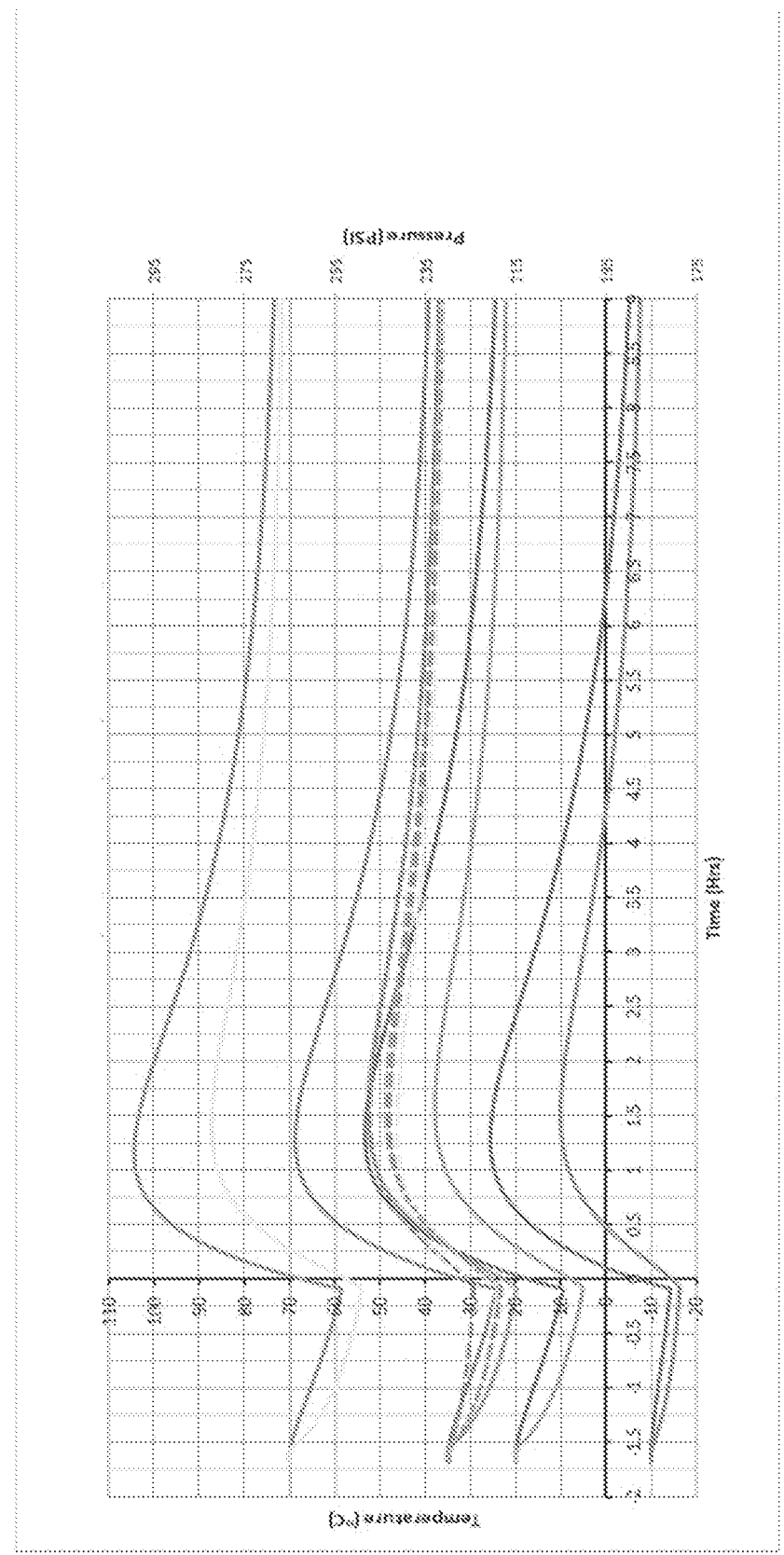
FIG. 8 depicts a plurality of different tire gas temperature profiles.

FIG. 8 depicts an example of a plurality of cooling profiles that can be used with the methods of FIGS. 6 and 7. As with FIG. 5, the data here is representative to assist understanding and is not based on any one particular source. The cooling profiles can be stored locally on the device carrying out the method of FIG. 6 or 7 or externally in another computer system or database in communication with the device carrying out the method of FIG. 6 or 7.

Figure 10:
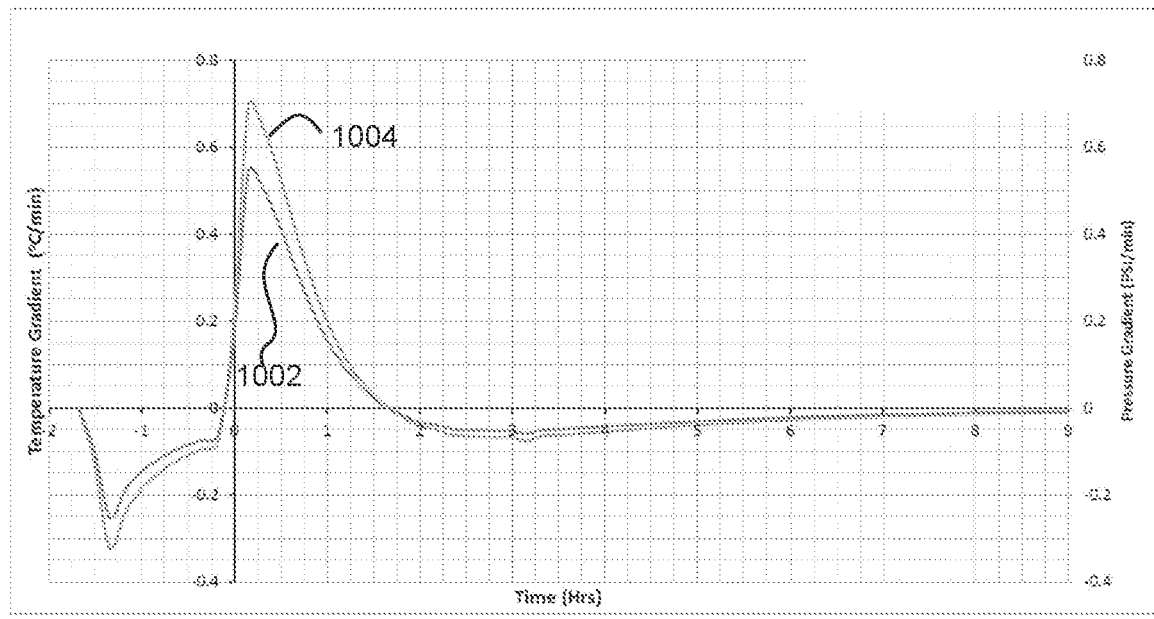
FIG. 10 is a plot of the gradient of the data of FIG. 9.
Figure 9:
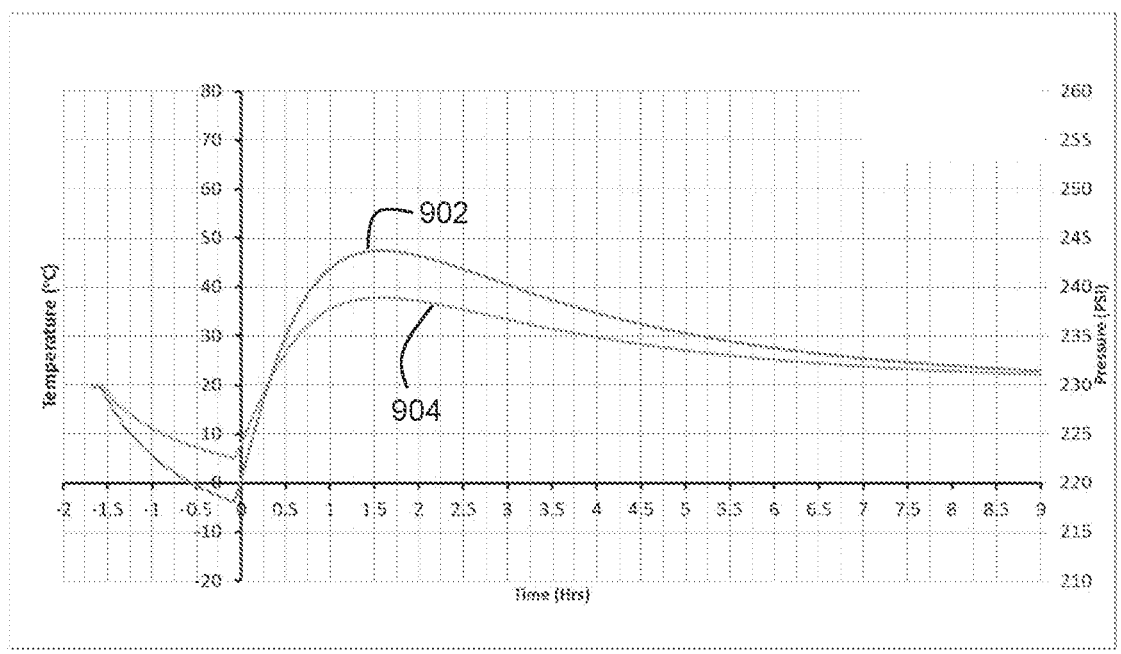
FIG. 9 is a plot of simulated tire gas pressure and temperature over time.

FIGS. 9 and 10 depict how gradients can be useful in the prediction. FIG. 9 shows simulated data for tire gas pressure 902 and tire gas temperature 904 varying over time. FIG. 10 shows the gradient of tire gas pressure 1002 and tire gas temperature 1004 data in FIG. 9. The gradient can enable a landing event to be identified more easily. In some examples, the gradient may also be used in when selecting a temperature profile by matching both the temperature over time and the temperature gradient over time.

While the methods above have described only the use of temperature profiles, pressure profiles may also be used and can improve the accuracy of pattern matching. In these methods a temperature profile has an associated tire gas pressure profile, which may expressed as measured values or values normalized to a constant predetermined temperature, such as 15° C.

Temperature profiles are useful for landing events, where there is a high energy to dissipate and many variables that can influence the result. A different approach can be used for lower energy events, such as when an aircraft taxis from one location to another. There is still energy input which can result in heating, but it is much lower than on landing. During a taxi, tire flexure and brake temperature are lower than on landing.

Figure 11:
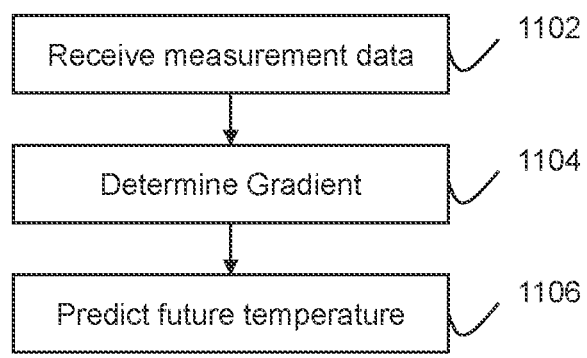
FIG. 11 is a flow chart of a method of predicting a future temperature using a gradient of historical temperature data.

FIG. 11 depicts a method of predicting future temperature by determining a temperature gradient over time, that can be implemented by a processing system. As before the processing system can form part of a maintenance device, a central maintenance system or the tire monitoring device itself.

While many short taxi events create minimal aircraft tire gas heating, in order to ensure safety, tire maintenance procedures nevertheless require an aircraft to stand for 3 hours after a taxi before carrying out tire maintenance. By examining the gradient of historical measurement data, gas temperature can be predicted more reliably. Once an aircraft is standing energy input to the wheel system is minimal so, if the gradient is shallow, the temperature is unlikely to rise much and so the gradient can be used confirm that it is safe to carry out tire maintenance without waiting a full 3 hour standing time.

Referring to FIG. 11, at block 1102, data is received comprising a plurality of measurements of temperature with associated times, which has been measured by a tire monitoring device affixed to an aircraft wheel. The data can be received over a communication interface from tire monitoring device, from another device, or from another system of the device containing the processing system. Next, at block 1104, the gradient of the temperature data is determined. Data representing a predetermined period of time, such as the last 30 minutes or the last 1 hour may be used to determine the current temperature gradient. Then, at block 1106, the gradient can be used to predict a future tire temperature, for example by extending a straight line with the determined gradient into the future from the current measured temperature. For a shallow gradient, the predicted future temperature may be little different than the current temperature and this can be used to conclude that tire measurement is safe despite the taxi. In some examples, the value of the temperature is also considered to ensure that it below a predetermined threshold for safe tire maintenance.

Figure 12:
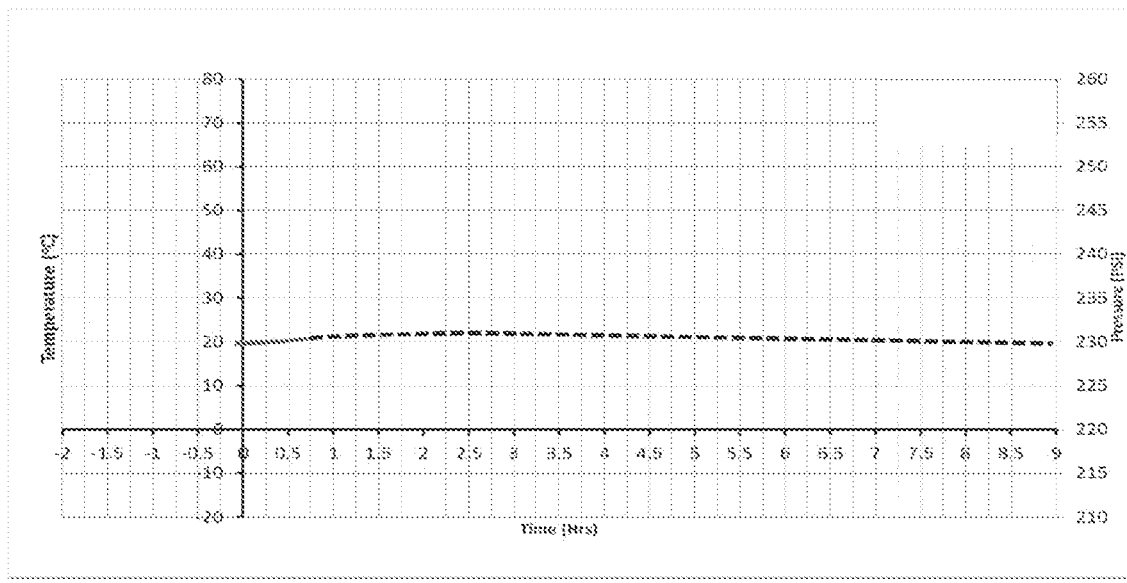
FIG. 12 is a plot of tire gas pressure and temperature against time following an aircraft taxi movement.

FIG. 12 depicts a graph of temperature and pressure against time for an aircraft following a taxi calculated using a Computational Fluid Dynamics (CFD) simulation. The aircraft has already been standing and the tire gas temperature and pressure were in equilibrium with the ambient temperature. The taxi caused gas temperature and pressure to rise slightly but the low energy means the rise is small. Determining the gradient and extrapolating the temperature to the future (the dashed part of the line in FIG. 12) show that no significant change in temperature is expected. Tire maintenance can take place at the new location without delay.

The method of FIG. 12 may be particular useful for aircraft maintenance locations. Although maintenance facilities can be located at airports, some maintenance may require moving the aircraft from its stand. Using the method of FIG. 12, tire maintenance can take place sooner because there is no need to wait 3 hours following the taxi.

Figure 13:
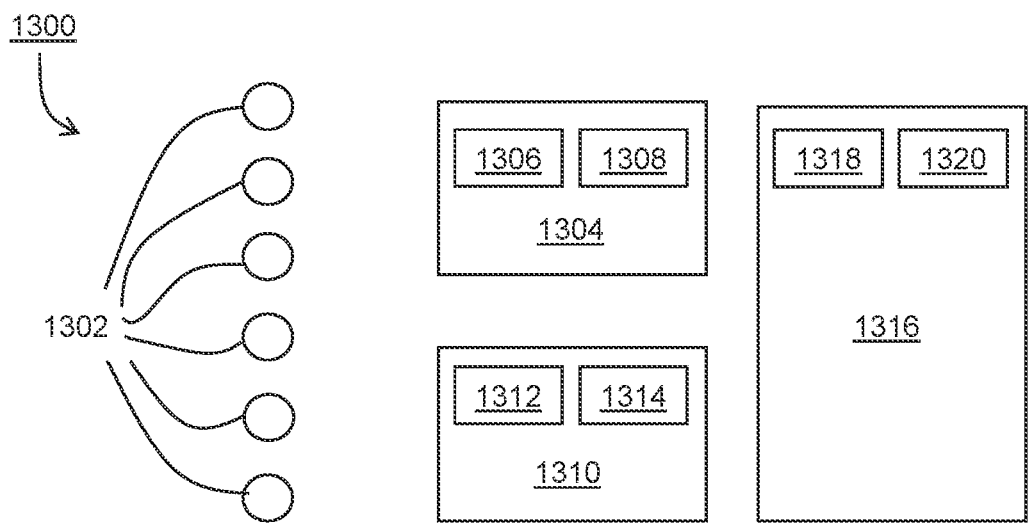
FIG. 13 shows a schematic representation of a system in which the methods may be implemented.

FIG. 13 is a schematic diagram of a system 1300 in which the methods of the present invention can be carried out. A plurality of tire monitoring devices 1302 as discussed above with reference to FIG. 1 are provided on a same aircraft. In this case there are six tire monitoring devices 1302 for a six-wheeled aircraft, such as an Airbus A320 discussed above with reference to FIG. 2. The tire monitoring devices 1302 are in communication with a cockpit information system 1304, which includes a processing system 1306 and a communication interface 1308. The tire monitoring devices are also in communication with a separate maintenance device 1310, such as a smart phone running a suitable app or another portable or hand-held device that can be used to interrogate the sensors and receive historical measurement data from the tire monitoring devices. Similar to the cockpit information system 1304, the maintenance device 1310 includes a processing system 1312 and a communication interface 1314.

One or both of the cockpit information system 1304 and the maintenance device 1310 is also in communication with a central maintenance system 1316. The central maintenance system 1316 comprises a processing system 1318 and a communication interface 1320. At predefined times, or in response to predetermined events, such as taking a tire pressure measurement, the cockpit information system and/or the maintenance device 1310 transmit historical data of tire pressure and temperature measurements to the central maintenance system using the communication interfaces. The communication interface 1308, 1314 of the cockpit information system and the maintenance device may comprise a separate interface for communicating with the central maintenance system or the same interface can be used as for communicating with the tire monitoring devices 1302. For example, the maintenance device communicates with the tire monitoring devices over a first wireless communication interface, such as according to an IEEE 802.11 standard, and communicates with the central maintenance system 1316 over a second wireless communication interface, such as one according to a cellular standard, such as those defined by 3GPP or ETSI.

Reference to a "processing system" includes a system with one or more processors (which may have one or more cores) as well as distributed processing systems which may be distributed over a plurality of physical devices and/or locations.

Where methods have been described above, they can be implemented wholly in software, wholly in hardware (such as by an application specific integrated circuit) or any combination of software and hardware. A software implementation may comprise computer-readable medium comprising instructions that instruct a processor to carry out the method. The computer-readable medium may be a non-transitory computer readable medium.

It is to be noted that the term "or" as used herein is to be interpreted to mean "and/or", unless expressly stated otherwise.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of measuring a tire gas pressure in an aircraft tire and/or performing a maintenance on the aircraft tire, the method comprising:
   receiving data of a plurality of measurements of temperature with associated times after a landing event, the data measured by a tire monitoring device affixed to an aircraft wheel;
   selecting a temperature profile from a plurality of predetermined temperature profiles based on the received data, the plurality of temperature profiles representing heating and cooling under different conditions;
   predicting a future tire gas temperature based on the selected temperature profile and the received data;
   using the future tire gas temperature to determine a time to measure tire gas pressure in the aircraft tire and/or perform maintenance on the aircraft tire, and
   at or after the time, measuring the tire gas pressure in the aircraft tire and/or performing the maintenance on the aircraft tire.

2. The method according to claim 1, wherein the data of a plurality of measurements comprises data covering a period of at least 30 minutes since the landing event.

3. The method according to claim 1, wherein the predicting a future tire gas temperature comprises predicting a time when the tire gas temperature will be equal to or less than a predetermined temperature.

4. A method of measuring a tire gas pressure in an aircraft tire and/or performing a maintenance on the aircraft tire, the method comprising:
   receiving data of a plurality of measurements of temperature with associated times after a landing event, the data measured by a tire monitoring device affixed to an aircraft wheel;
   selecting a temperature profile from a plurality of predetermined temperature profiles based on the received data, the plurality of temperature profiles representing heating and cooling under different conditions;
   predicting a future tire gas temperature based on the selected temperature profile and the received data;
   using the future tire gas temperature to determine a time to measure tire gas pressure in the aircraft tire and/or perform maintenance on the aircraft tire, and
   at or after the time, measuring the tire gas pressure in the aircraft tire and/or performing the maintenance on the aircraft tire,
   wherein the plurality of predetermined temperature profiles comprise profiles for a plurality of aircraft models, and wherein the selecting a temperature profile considers only predetermined temperature profiles for the aircraft model for which tire gas temperature is to be predicted.

5. The method according to claim 1, wherein the plurality of predetermined temperature profiles includes profiles representing different combinations of variables that influence tire gas temperature, the variables including at least one of wheel position, aircraft model, ambient temperature, weather conditions, and brake cooling fan operation status.

6. The method according to claim 5, further comprising:
   receiving input of at least one of the variables that influence tire gas temperature;
   determining a subset of the plurality of predetermined temperature profiles based on the input; and
   using the subset in the selecting a temperature profile.

7. The method according to claim 1, wherein the plurality of predetermined temperature profiles are stored in a database and generated from at least one of: a dynamometer test, in-flight data and a simulation.

8. The method according to claim 7, further comprising:
   generating a temperature profile from the received data of the plurality of measurements; and
   storing the generated temperature profile to the database.

9. The method according to claim 1, wherein the predicting a future tire gas temperature comprises using gradients to determine a maximum future gas temperature of the tire.

10. The method according to claim 1, further comprising providing a maintenance indication based on the predicted future gas temperature.

11. The method according to claim 1, wherein the plurality of measurements of temperature are determined from a plurality of pressure measurements.

12. A processing system configured to predict tire gas temperature of an aircraft tire according to the method of claim 1.

13. A computer readable medium comprising instructions that, when executed by a processing system, instruct the processing system to perform the method of claim 1.

14. A method of measuring a tire gas pressure in an aircraft tire and/or performing a maintenance on the aircraft tire, the method comprising:
   receiving data of a plurality of measurements of temperature with associated times, the data measured by a tire monitoring device affixed to an aircraft wheel;
   selecting a temperature profile from a plurality of predetermined temperature profiles based on the data;
   determining a gradient of the temperature using the selected temperature profile and the data; and predicting a future tire gas temperature using the gradient,
using the future tire gas temperature to determine a time to measure tire gas pressure in the aircraft tire and/or perform maintenance on the aircraft tire, and
at or after the time, measuring the tire gas pressure in the tire and/or performing the maintenance on the aircraft tire.

15. The method according to claim 14, wherein the predicting a tire gas temperature comprises predicting that temperature will remain below a predetermined threshold temperature.

16. The method according to claim 14, wherein the plurality of measurements comprise data covering a period of at least 30 minutes.

* * * * *